United States Patent [19]

Ilyes

[11] Patent Number: 5,499,554
[45] Date of Patent: Mar. 19, 1996

[54] NUT WRENCH DEVICE, ESPECIALLY FOR LOOSENING OR TIGHTENING WHEEL NUTS OR SIMILAR

[76] Inventor: Ivan Ilyes, Sportvägen 32, S-246 52 Löddeköpinge, Sweden

[21] Appl. No.: 347,485
[22] PCT Filed: Feb. 16, 1994
[86] PCT No.: PCT/SE94/00129
§ 371 Date: Dec. 21, 1994
§ 102(e) Date: Dec. 21, 1994
[87] PCT Pub. No.: WO94/22642
PCT Pub. Date: Oct. 13, 1994

[30] Foreign Application Priority Data

Apr. 7, 1993 [SE] Sweden ................................ 9301170

[51] Int. Cl.⁶ .................................................. B25B 33/00
[52] U.S. Cl. ............................................. 81/55; 81/180.1
[58] Field of Search ............................. 81/52, 55, 58.1, 81/180.1, 462

[56] References Cited

U.S. PATENT DOCUMENTS 3,392,608  7/1968  Schanen et al. .
4,104,936  8/1978  Sjöström ................................ 81/180.1

FOREIGN PATENT DOCUMENTS 2183517  12/1973  France .
2445758   8/1980  France .
2452576  11/1976  Germany .
8400756-6 10/1986  Sweden .
457698    1/1989  Sweden .

Primary Examiner—James G. Smith
Attorney, Agent, or Firm—Burns, Doane, Swecker & Mathis

[57] ABSTRACT

A nut wrench device, especially for loosening or tightening wheel nuts or similar (22), comprising an input axle (1) having operating means (3,23), an output axle (17) having actuating means (19–21) disposed at one of its ends, which actuating means (19–21) has a non-round peg (20) on which a nut socket or the like (21) is non-rotatably secured for wrenching the nut (22), a force transmission mechanism (7–16, 24, 26–29) which links the input axle (1) with the output axle (17), and anchoring means (5,25) to anchor the nut wrench device on a second wheel nut (6) spaced from the nut (22), whereby a force applied to the operating means is transmitted as a torque to the nut (22) which is to be wrenched. Novel in the invention is that the anchoring means (5,25) is disposed at one end of the input axle (1) and the operating means (3,23) is disposed at the second end (2), and the force transmitting mechanism (7–16, 24, 26–29) comprises a link member (9) which is connected to the input axle (1) via its first end and connected to the output axle (17) via its second end (2), the link member (9) being disposed substantially at right angles to both the input axle (1) and the output axle (17).

1 Claim, 3 Drawing Sheets

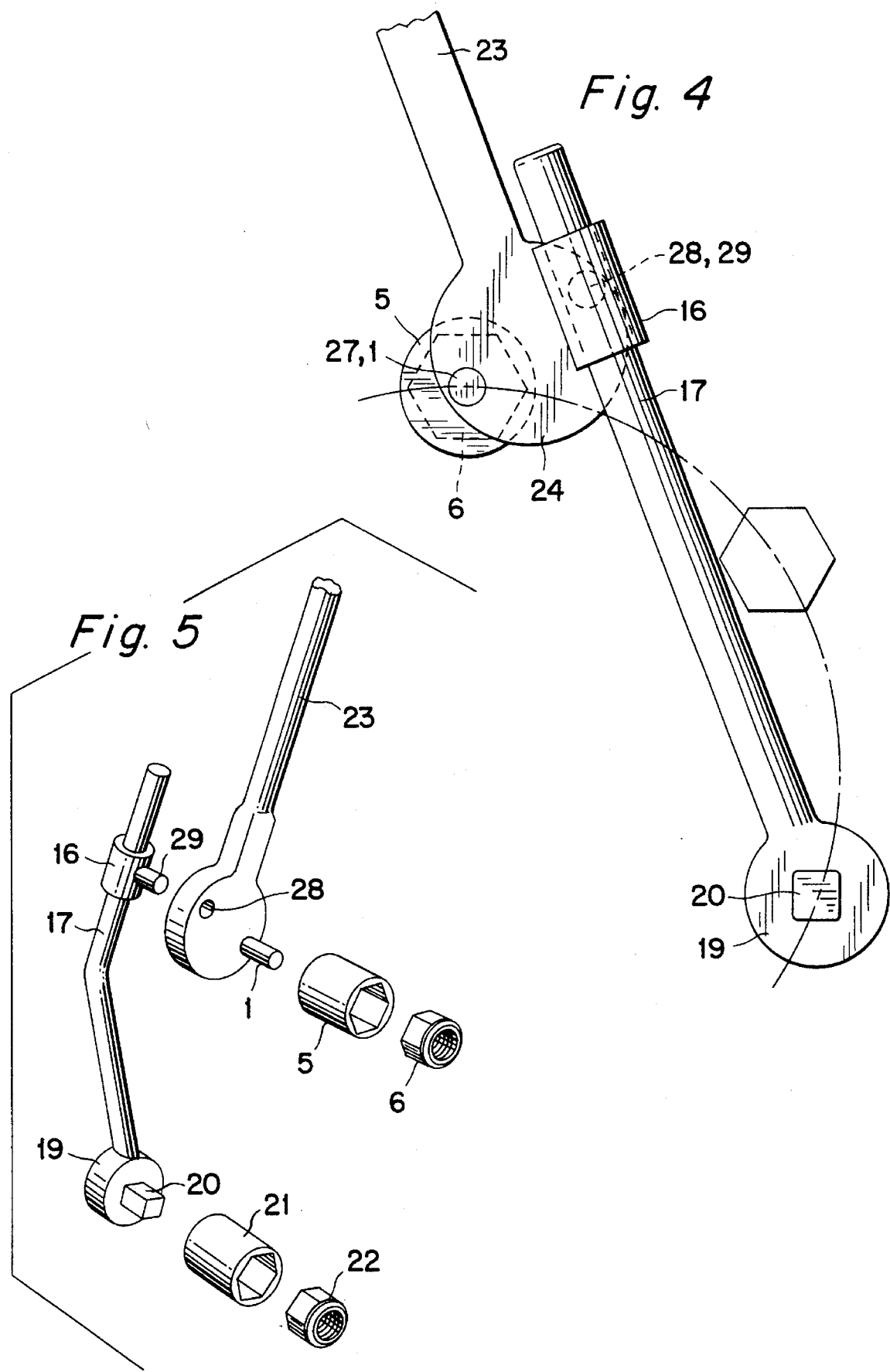

NUT WRENCH DEVICE, ESPECIALLY FOR LOOSENING OR TIGHTENING WHEEL NUTS OR SIMILAR

The present invention is directed to a nut wrench device, especially for loosening or tightening wheel nuts or similar, comprising an input axle having operating means, an output axle having actuating means disposed at one of its ends, which actuating means has a non-round peg on which a nut socket or the like is non-rotatably secured for wrenching said nut, a force transmission mechanism which links the input axle with the output axle, and anchoring means to anchor the nut wrench device adjacent a second wheel nut spaced from said nut, whereby a force applied to the operating means is transmitted as a torque to the nut which is to be wrenched.

More particularly, the invention is primarily directed to a manual device for initially loosening a nut or bolt which is hard to budge, for example due to it having been tightened too hard or to its threads having stuck in its receiving thread because of corrosion, material migration, mechanical damage or similar. When the jammed thread engagement has been released, the nut or bolt can afterwards be loosened with a socket wrench, a cross-shaped wheel wrench or the like, or by also using the device of the invention thereafter. Conversely, a jammed (hard tightened) receiving thread can also be obtained with a final tightening with the device according to the invention.

Devices for tightening or loosening nuts or bolts have been previously described in many variations and a device which is particularly suited to wheel nuts is shown in Swedish patent specification no. 8400756-6 (publication no. 446 700), which comprises a gear mechanism disposed in a housing, an output axle disposed on one side of the housing, an adjustable anchoring means disposed on the same side, and an input axle disposed on the opposite side of the housing. The anchoring means comprises a peg set fast on a sliding body which is axially translatable along, and in profile-bound sliding engagement with, a guide rail. Although this device functions as intended, it is, however, beset with certain drawbacks. The sprocket mechanism to provide the mechanical advantage is an unnecessarily expensive and complicated solution, additionally requiring an enclosed and protective housing which also serves as the supporting means for the incorporated components. This leads to the device being comparatively heavy, requiring relatively large storage and working spaces and above all to the housing, during use, covering the wheel nuts and consequently obstructing threading of the wheel nut sockets onto the associated wheel nuts or bolts. Additionally, the device is difficult to use on vehicles having double wheel-sets, such as the rear wheels of trucks and similar.

The object of the present invention is thus to provide a nut device of low weight, which is easy to apply and operate and which requires minimal storage space.

A further object of the invention is to provide a nut wrench device which is simple and cheap to produce, and in which the incorporated components are supported by each other and by the relevant wheel nut, respectively.

These objects are achieved in accordance with the invention in a nut wrench device as defined above, which is characterized in that the anchoring means is disposed at one end of the input axle and the operating means is disposed at its second end, and the force transmitting mechanism comprises a link member which is connected to the input axle via its first end and connected to the output axle via its second end, the link member being disposed substantially at right angles to both the input axle and the output axle.

Further refinements of the invention will be apparent from the features specified in the subsidiary claims.

Preferred embodiments of the invention will now be described by way of example and with reference to the accompanying drawings, in which:

FIG. 4 is a view similar to that in FIG. 1, showing a further embodiment of the device of the invention; and FIG. 5 shows the device of FIG. 4 in an exploded representation and in a side view.

Figure 1:
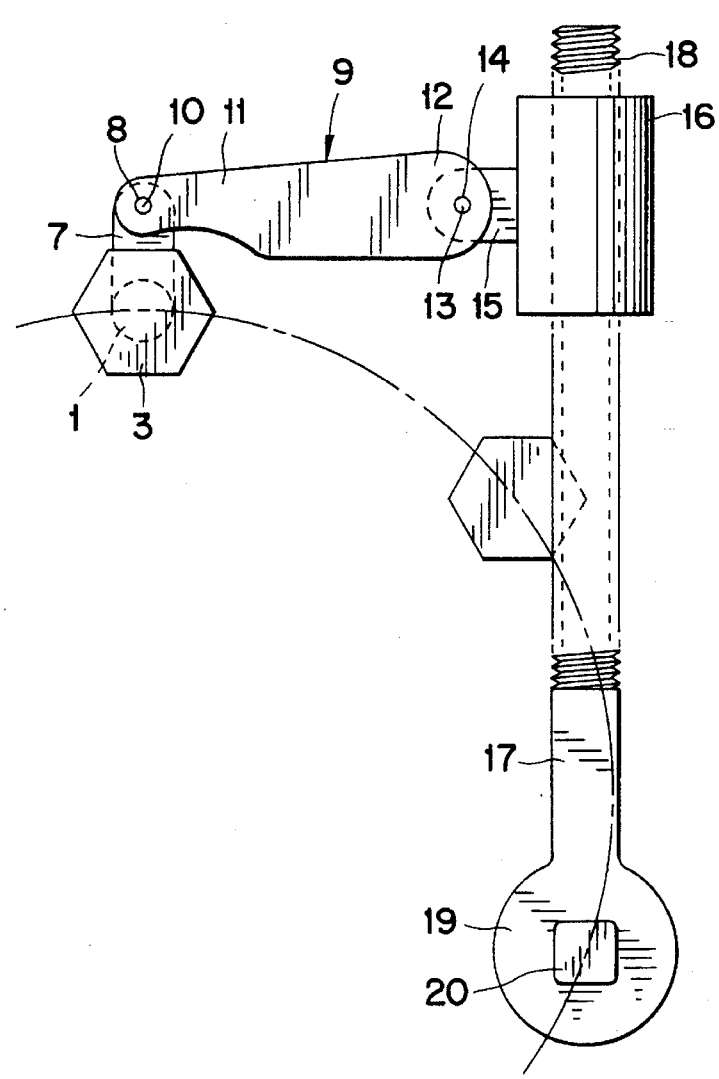
FIG. 1 is a front view showing an embodiment of the nut wrench device of the invention.
Figure 2:
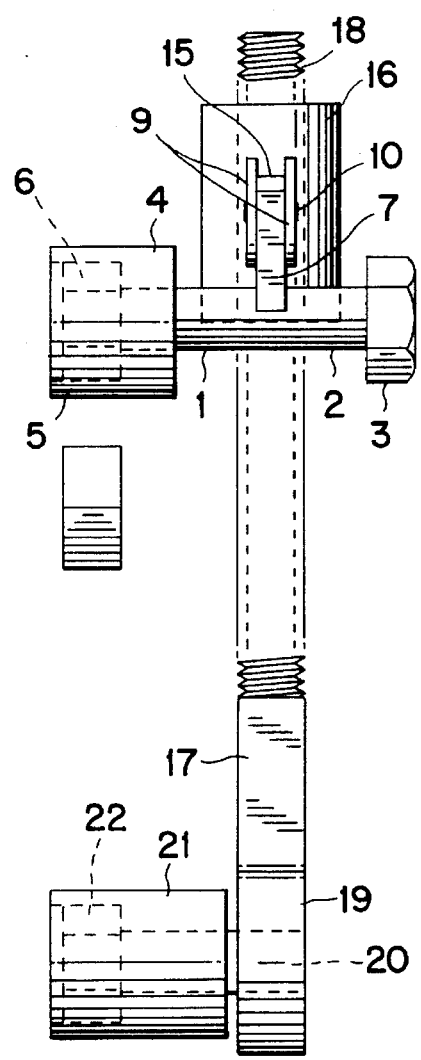
FIG. 2 shows a side view of the device in FIG. 1.

Referring initially to FIGS. 1 and 2, the nut wrench device of the invention comprises an input axle 1 having a round section, whose first end 2 presents a welded-on bolt head 3 (or something similar) operating means fixedly secured to the input axle. A wrench socket 5 or similar is rotatably arranged for fitting of the socket over a wheel nut or bolt 6 and forms an anchoring means for the nut wrench device. A lug 7 projects from the the input axle 1 intermediate its ends 1, 4 and is provided with a through going bore 8 in which a link member 9 is rotatably secured with a pin 10 or the like. FIG. 1 depicts the link member as consisting of two parallel and identical plates, but the link member may also be formed from a solid body having fork-like end portions. The first end 11 of the link member is thus rotatably secured to the input axle 1, while its second end 12 is rotatably secured in a similar manner with a pin 13 in a through going bore 14 in a lug 15 which projects from a tube-shaped socket 16.

Alternatively, the end 11 may be rotatably secured directly on the socket by means of the pin 13. The socket 16 presents an internal thread in thread engagement with the external thread 18 of an output axle 17. A head 19 is disposed adjacent the opposite end of the output axle 17, from which a non-round peg 20 projects. The peg 20 is depicted in FIGS. 1 and 2 with a quadrilateral section. A wheel nut socket 21, of the same sort as the socket 5, is non-rotatably secured on the free end of the peg, for engagement with the wheel nut or bolt 22 which is to be loosened or tightened. In order to obtain optimal functioning of the nut wrench, the distance between said wheel nuts 6 and 22 should be as large as possible, while the link member 9 by means of the socket 16 and the threads 18 is arranged substantially at a right angle to the output axle 17, as is apparent from FIG. 1.

After the wheel nut socket 5 has been pushed over the wheel nut 6, the wheel nut socket 21 has been pushed over the wheel nut 22, and the socket 16 has been placed at the right height as described above by rotaating the output axle 17, the bolt head 3 is brought into engagement with a suitable tool (not depicted), such as a cross-shaped wheel wrench, a socket spanner, a rachet spanner or the like, with which the bolt head is turned. As the input axle 1 is freely rotatable in the wheel nut socket 5, which in turn is snuggly fitted over the wheel nut 6, serving as a stabilising point and stabilising axle, force is transmitted from the tool via the input axle 1, the lug 7, the link member 9, the lug 15, the socket 16, the output arm 17, the head 19, the peg 20 and the wheel nut socket 21 as a torque on the wheel nut 22 snugly fitted in the wheel nut socket 21. The mechanical advantage obtained in this manner is accordingly the distance between the pin 13 and the peg 20 in relation to the distance between the pin 10 and the input axle 1, which is of the order of magnitude 10:1. This is amply sufficient to loosen (tighten) most wheel nuts (bolts).

When the wheel nut 22 has been loosened, the nut wrench device may be removed and said tool fitted directly over the wheel nut in order to carry on with loosening it. It is, of course, also possible to use the nut wrench of the invention for this purpose also, in which case it may be convenient to arrange a rachet mechanism (not depicted) in the head 19 which bears the peg 20.

When the nut wrench device is not in use, it is stored folded up with the link member abutting the exit axle and thus takes up very little space.

Figure 3:
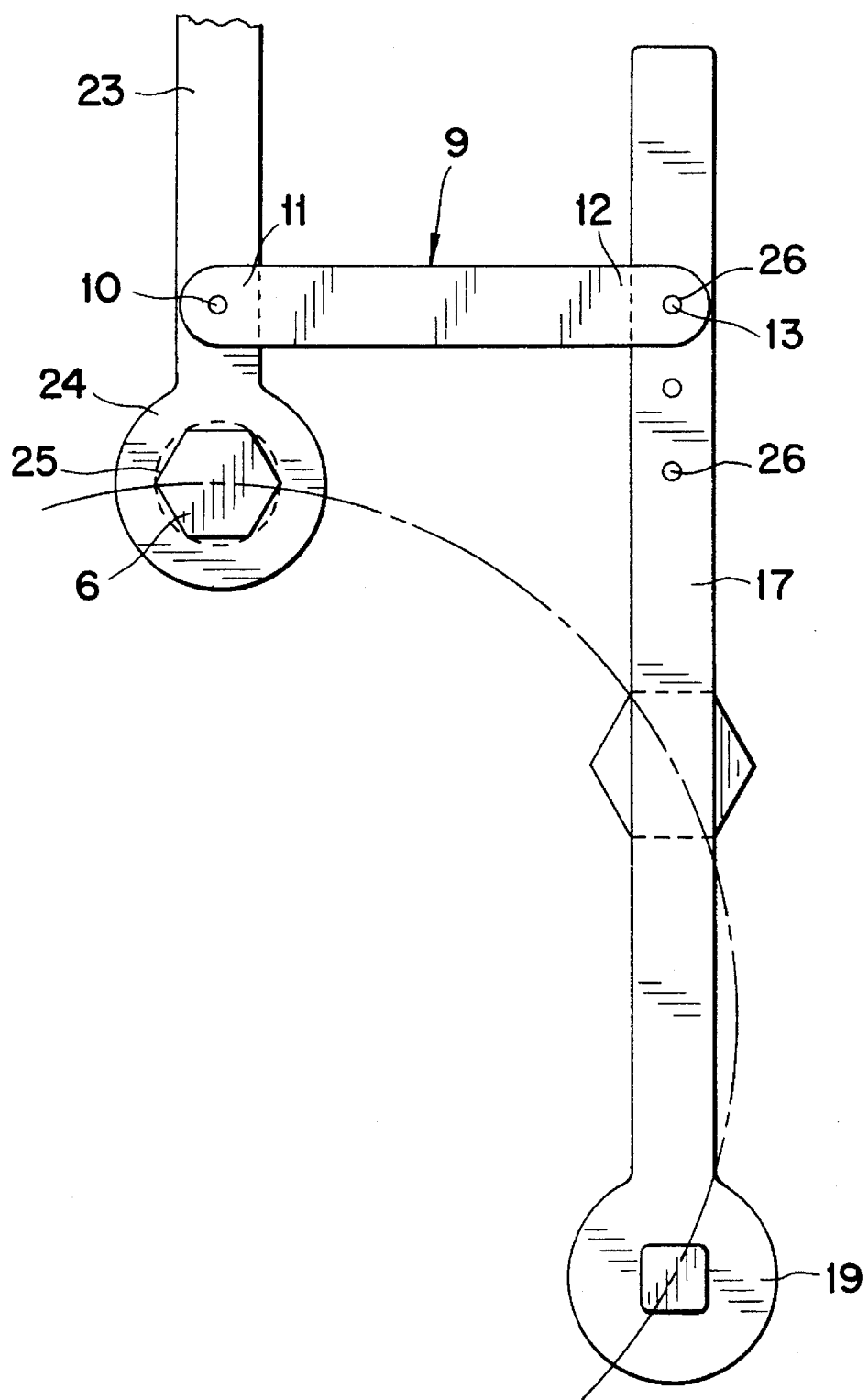
FIG. 3 is a view similar to that in FIG. 1, showing an alternative embodiment of the nut wrench device.

Reference is now made to FIG. 3 which depicts an alternative embodiment of the nut wrench of the invention. The first end 11 of the link member 9 in this embodiment is rotatably secured to the shaft of an above mentioned operating tool 23, instead of the mounting lug 7, as in the embodiment of FIGS. 1 and 2. The link member may be secured with a pin-bore joint as described above, a bolt joint, a ring-shaped means attached to the shaft and having mounts for the link member etc. The head 24 of the tool presents a hexagonal cavity which matches the above mentioned bolt head 3 on the input axle (not depicted in the drawing). Alternatively, a cylinder-shaped axle projects from the head 24 and replaces the above mentioned input axle, the wheel nut 6 being snugly received in a round cavity 25 in said axle, as is shown in FIG. 3. As a further alternative, the tool 23 may be an arm which is welded fast to the end of the input axle 1 instead of the bolt head 3 (of FIG. 1).

The second end 12 of the link member 9 in the embodiment depicted in FIG. 3 is rotatably secured directly to the output axle 17, the pin 13 being received in a through going bore 26 in the output axle 17, which may present one or more through going holes 26 in order to enable the link member to be arranged substantially at a right angle to the exit axle. Otherwise, the construction and functioning of the nut wrench device is the same as that discussed above in relation to FIGS. 1 and 2.

FIGS. 4 and 5 depict a further embodiment of the nut wrench device of the invention, in which the link member is integrated with the operating tool 23. The head 24 of this embodiment is a solid body having two through going bores 27 and 28 disposed diametrically opposite each other. The input axle 1 is received in one end of the bore 27 or the input axle is formed in one piece with the head 24 located at that place. As is indicated above, a wheel nut socket 5 is arranged to be freely rotatable on the opposite end of the round input axle 1. A peg 29 is rotatably received in the other bore 28, which peg projects from the socket 16. The socket 16 in turn is journalled to be freely slidable on the output axle 17 in its longitudinal direction. If so desired, a stop (not depicted) may be arranged on the free end of the output axle to prevent the socket from sliding off the output axle. The opposite end of the output axle 17 presents a head 19 having a non-round peg 10 and wheel nut socket 24 in order to loosen the wheel nut 22, as is discussed above in relation to the earlier presented embodiments of the invention.

After the wheel socket 5 has been pushed over the wheel nut 22, the wheel socket 21 is put over the wheel nut 2 and at the same time the socket 16 is juggled so that the peg 29 can be inserted into the bore 28. To this end, the tool 23 is rotated so that the angle which is defined by the secant between on the one hand a line between the bores 27 and 28 and on the other hand a line between the bore 28 and the peg 20, is acute, as is illustrated in FIG. 4. By rotating the tool 23 in FIG. 4 clockwise, said angle increases and output axle 17 is rotated clockwise, transmitting a torque to the wheel nut 22 via the wheel nut socket 21. The rotating movement of the exit axle is not great but is sufficient to loosen the wheel nut. In order to facilitate securement of the socket 16 in the bore 28, the head 19 preferably presents a catch mechanism (not depicted) such as those found in ratchet spanners in socket wrench sets.

In a still further embodiment of the invention (not depicted), a longitudinally extending groove is located in the arm of the operating tool, and a peg projecting from the output arm is inserted in said groove in order to transmit the rotating movement of the tool to the output axle and consequently to the wheel nut which is to be wrenched.

The components and features incorporated in the above presented embodiments and likewise equivalent constructions may be combined in a number of ways, as will be apparent to those skilled in the art with the benefit of the teachings of the invention.

Where greater forces are required, as in the case of truck wheels and similar, the mutual spacing of the wheel nuts is relatively large which leads to the length of the output axle between the nuts which are to be loosened and the second end of the link member is correspondingly longer, i.e. the mechanical advantage has correspondingly increased. This generally means that the mechanical advantage of the nut wrench device automatically increases with increasing wheel diameter and accordingly increased force requirement.

The nut wrench device has been discussed in the presented embodiments of the invention in connection with loosening or tightening of wheel nuts and bolts but it is, of course, also possible to utilize the device on other types of bolt joint groups, such as machine frames, structural constructions etc where the respective bolts and nuts are disposed in relatively regular mutual spacings with respect to each other.

The invention should therefore not be considered as limited to what has been described and depicted in the drawings but rather can be modified in numerous ways within the scope of the following patent claims.

I claim:

1. A nut wrench device, especially for loosening or tightening wheel nuts or similar, comprising an input axle having operating means, an output axle having actuating means disposed at one of its ends, which actuating means has a non-round peg on which a nut socket or the like is non-rotatably secured for wrenching said nut, a force transmission mechanism which links the input axle with the output axle, and anchoring means to anchor the nut wrench device on a second wheel nut spaced from said nut, whereby a force applied to the operating means is transmitted as a torque to the nut which is to be wrenched, the anchoring means is disposed at one end of the input axle and the operating means is disposed at its second end, wherein the force transmitting mechanism comprises a head integrated with one end of said force transmission mechanism, the second end of said input axle disposed substantially at the periphery of the head, a second bore disposed substantially at the periphery of the head opposite said input axle, a socket member enclosingly and slidably arranged on said output axle, and a peg which is projecting from the socket member at an angle to an axle of said socket member and which is receivable in said bore of said head.

\* \* \* \* \*